E. P. ROBBINS AND S. S. MATTHES.
MEASURING DEVICE.
APPLICATION FILED FEB. 10, 1919.
1,383,340.                                     Patented July 5, 1921.
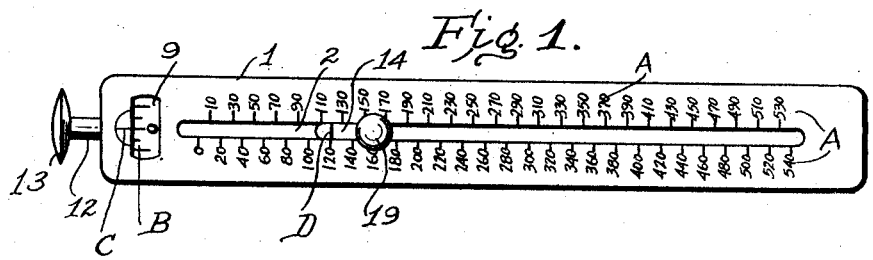
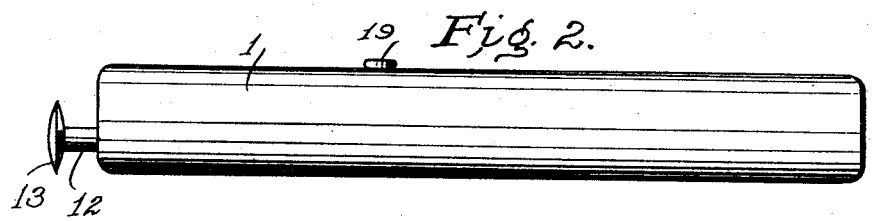
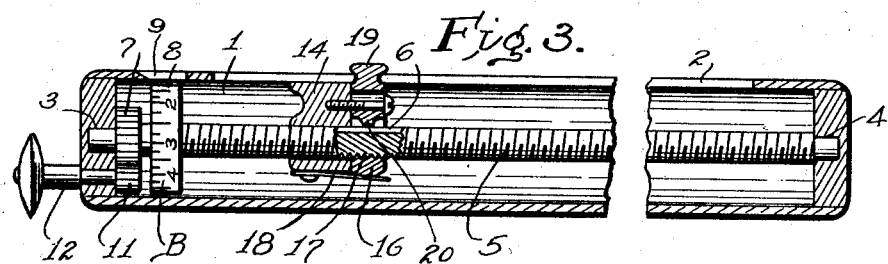
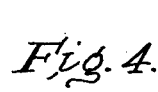
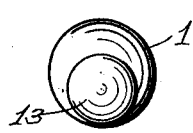
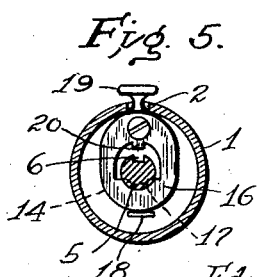
Inventors
Edward P. Robbins
Samuel S. Matthes
By
S. S. Matthes  Attorney

UNITED STATES PATENT OFFICE.

EDWARD P. ROBBINS AND SAMUEL S. MATTHES, OF MANSFIELD, OHIO.

MEASURING DEVICE.

1,383,340.      Specification of Letters Patent.      Patented July 5, 1921.

Application filed February 10, 1919. Serial No. 276,015.

*To all whom it may concern:*

Be it known that we, EDWARD P. ROBBINS and SAMUEL S. MATTHES, citizens of the United States, residing at Mansfield, in the county of Richland and State of Ohio, have invented certain new and useful Improvements in Measuring Devices, of which the following is a specification.

This invention relates to improvements in measuring instruments, and particularly to that type of such devices which are employed for measuring the length of a straight, curved or irregular line between two or more points.

One object of the invention is to provide a device of this character by means of which the measurements referred to may be accurately and quickly obtained.

Another object is to provide a measuring device for the purpose stated which will be effective and efficient in operation and which will be durable, strong and simple of construction.

A further object is to provide an improved instrument of this character comprising means which will enable the mechanism to be quickly set to zero.

To the attainment of these ends and the accomplishment of other new and useful objects, as will appear, the invention consists in the novel features of the construction, combination and arrangement of the several parts to be hereinafter described and claimed and shown in the accompanying drawings, in which:

Figure 1 is a top view of a measuring instrument embodying our invention.

Fig. 2 is a side elevational view of the device.

Fig. 3 is a view similar to Fig. 2, some of the parts being shown in section to illustrate the constructional arrangement of the various parts.

Fig. 4 is an end view of the device.

Fig. 5 is a sectional view taken on the line 5—5 of Fig. 3.

The same reference characters indicate the same parts throughout the several views.

Referring to the drawings which illustrate one embodiment of the present invention, the casing 1 is provided with a longitudinal slot 2 having an external scale preferably arranged at opposite sides thereof, as shown. Mounted in suitable bearings 3 and 4 provided in opposite ends of the casing is an externally threaded shaft 5, which has a longitudinal groove 6.

Secured to the shaft 5, adjacent one end thereof, is a gear 7 and a disk 8. The disk has a scale B provided on its periphery employed to indicate a predetermined number of feet and fractions thereof. A portion of this scale is exposed through an opening 9, formed in the casing which has a reading line C to coöperate with said scale.

Meshing with the gear 7 is a pinion 11 secured to one end of a spindle 12, which is rotatably mounted in the end of the casing and disposed in parallel relation with the shaft 5. The spindle has a tracing wheel 13 secured to its outer end, said wheel being adapted to trace or run over a line to be measured, thereby imparting rotary movement through the gears described to the screw threaded shaft 5.

Slidably mounted on the shaft for longitudinal movement within the casing is a slide 14, provided with a reading line D, to coöperate with the external scale A on the casing. This slide comprises a relatively movable part 16, provided with an internally threaded portion 17, which is normally held in engagement with the threads of the shaft by means of a spring 18, as shown. The part 16 has a knob 19 projecting through the slot 2 in the casing and is provided with a lug 20 adapted to enter the slot 6 in the shaft 5 by downward movement of the part 16 for the purpose to be presently described. Whenever it is desired to reset or adjust the device to the starting point it is necessary to first adjust the revolving disk 8, by rotating the tracing wheel 13 so as to bring the zero point of the scale B thereon to the reading line C, at which point the slot 6 in the shaft will be in line with the lug 20, and thus permit movement of the part 16 out of engagement with the shaft 5 in the manner described. Next the user presses against the knob 19 so as to disengage the threads of the shaft, as hereinbefore stated, and then the slide 14 can be moved along the casing to the starting point, where its reading line D indicates zero on the external scale A.

From the foregoing it will be noted that it is not necessary to run the mechanism backward for resetting the device, but that the parts can be quickly and easily adjusted to zero, and that it is impossible to adjust the slide to the starting point, or zero, without adjusting the revolving scale to zero also.

In use, the tracing wheel is simply run over a line which it is desired to measure, the proportions of the periphery of the wheel and of the gears and the pitch of the threads of the shaft being such as to indicate measurements according to any preferred scale, the revolving scale indicating a limited number of feet and fractions thereof, and the external scale showing the sum total of the measurements of said revolving scale.

Having thus fully described our invention and illustrated one embodiment of the same, we do not wish to be limited to the details of the construction shown since these can obviously be changed without departing from the spirit and scope of this invention.

What we claim as new, and desire to secure by Letters Patent of the United States is:—

1. A measuring device comprising a casing, a screw threaded shaft therein, a disk provided with a scale on its periphery secured on the shaft within the casing, an opening in the casing exposing a portion of the scale, a reading line on the casing to coöperate with said scale, a slide within the casing normally engaging the threads of said shaft and having a reading line to coöperate with a scale on the casing, a spindle rotatably mounted in one end of the casing and parallel with the shaft, a tracing wheel secured to the outer end of the spindle, means connecting the opposite end of the spindle to the shaft whereby rotation of the wheel is transmitted to the shaft thereby to impart longitudinal movement to the slide relatively to the casing, and means whereby the slide and shaft may be disengaged for resetting the slide.

2. A measuring device comprising a casing having a slot and provided with a scale along said slot, a screw threaded shaft in the casing, an actuating wheel mounted to rotate in a plane disposed in substantially right angular relation to the axis of the shaft and adapted to trace over a line to be measured, means rotatably connecting the wheel and shaft whereby movement of the wheel is transmitted to the shaft, a disk on the shaft within the casing and having a scale provided on its periphery to coöperate with a reading line on the casing, a slide in the casing comprising a movable part having screw threads normally held in engagement with the threads on the shaft but movable out of engagement therewith to permit movement of the slide to reset the device, and a reading line on the slide to coöperate with the scale on the casing for the purpose described.

In testimony whereof we affix our signatures.

EDWARD P. ROBBINS.
SAMUEL S. MATTHES.